United States Patent
Lin et al.

(10) Patent No.: US 12,207,275 B2
(45) Date of Patent: Jan. 21, 2025

(54) METHOD OF UPLINK TRANSMISSION AND RELATED DEVICE

(71) Applicant: SHARP KABUSHIKI KAISHA, Sakai (JP)

(72) Inventors: Chia-Hung Lin, Taipei (TW); Hung-Chen Chen, Taipei (TW); Chia-Hao Yu, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 274 days.

(21) Appl. No.: 17/765,969

(22) PCT Filed: Sep. 24, 2020

(86) PCT No.: PCT/CN2020/117549
§ 371 (c)(1),
(2) Date: Apr. 1, 2022

(87) PCT Pub. No.: WO2021/063248
PCT Pub. Date: Apr. 8, 2021

(65) Prior Publication Data
US 2022/0353901 A1    Nov. 3, 2022

Related U.S. Application Data

(60) Provisional application No. 62/910,591, filed on Oct. 4, 2019.

(51) Int. Cl.
*H04L 1/00*      (2006.01)
*H04W 72/23*    (2023.01)
(Continued)

(52) U.S. Cl.
CPC .......... *H04W 72/23* (2023.01); *H04L 1/0008* (2013.01); *H04W 74/0833* (2013.01); *H04W 76/20* (2018.02)

(58) Field of Classification Search
CPC . H04W 72/23; H04W 74/0833; H04W 76/20; H04W 74/006; H04L 1/0008
See application file for complete search history.

(56) References Cited

U.S. PATENT DOCUMENTS

2010/0254335 A1    10/2010   Koo et al.
2021/0227397 A1     7/2021   Hu et al.
(Continued)

FOREIGN PATENT DOCUMENTS

| CN | 106452705 A | 2/2017 |
| CN | 110115096 A | 8/2019 |
| WO | 2020/198912 A1 | 10/2020 |

OTHER PUBLICATIONS

Qualcomm Incorporated, "Channel Structure for Two-Step RACH", R1-1907691, 3GPP TSG-RAN WG1 Meeting #97, May 13-17, 2019, Reno, USA.

*Primary Examiner* — Lan-Huong Truong
(74) *Attorney, Agent, or Firm* — ScienBiziP, P.C.

(57) ABSTRACT

A method of uplink transmission for a user equipment (UE) is disclosed. The method comprises receiving, from a base station (BS), a threshold; determining at least one uplink grant according to the threshold; performing a payload transmission on the at least one uplink grant while the UE is in an RRC inactive state; and not transmitting only padding bits for the payload transmission on the uplink grant.

6 Claims, 6 Drawing Sheets

(51) Int. Cl.
*H04W 74/0833* (2024.01)
*H04W 76/20* (2018.01)

(56) References Cited

U.S. PATENT DOCUMENTS

2021/0297221 A1* 9/2021 Lee .................... H04L 5/0053
2021/0352735 A1* 11/2021 Bae .................... H04W 52/48
2022/0110184 A1* 4/2022 Jeon ................... H04L 1/0015
2022/0264659 A1* 8/2022 Enbuske ........... H04W 74/0866

* cited by examiner

METHOD OF UPLINK TRANSMISSION AND RELATED DEVICE

CROSS-REFERENCE TO RELATED APPLICATION(S)

This application is the National Stage of International Patent Application No. PCT/CN2020/117549, filed on Sep. 24, 2020, entitled "METHOD OF PHYSICAL UPLINK SHARED CHANNEL RESOURCE UNIT SELECTION AND RELATED DEVICE," which claims the benefit of and priority to U.S. Provisional Patent Application Ser. No. 62/910,591, filed on Oct. 4, 2019, entitled "PUSCH Resource Unit (PRU) Selection for Two-step RACK Msg-A transmission," the contents of all which are hereby incorporated fully by reference into the present disclosure.

FIELD

The present disclosure generally relates to wireless communications, and more particularly, to a method of uplink transmission and a related device configured to employ such a method.

BACKGROUND

Generally, a fifth generation (5G) base station (e.g., a gNB) does not schedule any resources for a user equipment (UE) in the idle state or inactive state to avoid resources wasting. Therefore, when the UE is required to be connected to a gNB and initiates data transfer, a random access (RA) procedure may be performed to connect to a cell (or a base station). Once the UE has detected a cell (and camped on this cell), the UE may initiate the RA procedure to access the cell. Conventionally, a four-step RA procedure is applied for the long term evolution (LTE) and new radio (NR) systems. The four-step RA procedure includes:

Step 1 (Message 1/Msg-1): the UE transmits a preamble to the gNB. This is also referred to as a Physical Random Access Channel (PRACH).

Step 2 (Message 2/Msg-2): the gNB (or eNB) transmits a Random Access Response (RAR) to indicate the reception of the preamble. Also, the RAR carries resource allocation information for the next step of Message 3 transmission.

Step 3 (Message 3/Msg-3): once the UE decodes the content of RAR successfully, the UE sends the Message 3 to request a radio resource control (RRC) connection, Step 4 (Message 4/Msg-4): the gNB (or eNB) transmits a physical downlink shared channel (PDSCH) carrying the Message 4 to make the UE transition to the RRC connected state. Contention Resolution ID (CRID) Media Access Control (MAC) control element (CE) may be included in the Message 4 for contention resolution.

Once the RA procedure is completed, the UE is in the RRC connected state and a communication between the gNB and the UE may be started by using a scheduling-based transmission.

Moreover, a 2-step RA procedure is introduced in the 3GPP to reduce the latency and the overhead of the conventional four-step RA procedure. A 2-step RA procedure may also be beneficial for a UE to access a cell operating on an unlicensed spectrum due to the LBT (Listen-Before-Talk) impacts. For example, some steps of the 4-step RA procedure are merged in the 2-step RA procedure, so that signaling may be efficiently saved (e.g., the number of message transmissions may be reduced). Specifically, Msg-1 may be combined with Msg-3 to be the Msg-A in a 2-step RA procedure, and Msg-2 may be combined with Msg-4 to be the Msg-B in the 2-step RA procedure. It is noted that the RAR included in a Msg-B may be different from the RAR included in a Msg-2.

In a 2-step RA procedure, the Msg-A is consisted of a preamble (on a PRACH) and a payload (on a PUSCH) carrying signaling/data. Generally, a base station (e.g., gNB) may perform detection on the PRACH (to receive possible transmitted preamble(s)) to determine whether to receive the corresponding payload(s) on the PUSCH. However, there is no specification for the LIE to select a physical uplink shared channel (PUSCH) resource unit (PRU) for a payload transmission. Thus, the UE may not know how to transmit the Msg-A during the 2-step RA procedure.

SUMMARY

The present disclosure provides a method of physical uplink shared channel (PUSCH) resource unit (PRU) selection and a related device.

According to an aspect of the present disclosure, a method of physical uplink shared channel (PUSCH) resource unit (PRU) selection for a user equipment (UE) in a random access procedure is disclosed. The method comprises receiving, from a base station (BS), a configuration to configure a preamble for the random access procedure and a plurality of PRUs corresponding to the preamble for a payload transmission of the random access procedure, determining a number of PRUs for the payload transmission according to one of an indication received from the BS and a number predefined in the UE, and selecting at least one PRU from the plurality of PRUs according to the determined number with at least one of a random selection, a criterion-based selection and a self-information based selection.

According to an aspect of the present disclosure, a method of physical uplink shared channel (PUSCH) resource unit (PRU) selection for a base station (BS) in a random access procedure is disclosed. The method comprises transmitting, to a user equipment (UE), a configuration to configure a preamble for the random access procedure and a plurality of PRUs corresponding to the preamble for a payload transmission of the random access procedure, determining a number of PRUs for the UE to use for the payload transmission, and transmitting, to the UE, an indication indicating the determined number:

According to another aspect of the present disclosure, a user equipment (UE) for physical uplink shared channel (PUSCH) resource unit (PRU) selection in a random access procedure is disclosed. The UE comprises a processor, for executing computer-executable instructions, and a non-transitory machine-readable medium, coupled to the processor, for storing the computer-executable instructions, wherein the computer-executable instructions instruct the processor to receive, from a base station (BS), a configuration to configure a preamble for the random access procedure and a plurality of PRUs corresponding to the preamble for a payload transmission of the random access procedure, determine a number of PRUs for the payload transmission according to one of an indication received from the BS and a number predefined in the UE, and select at least one PRU from the plurality of PRL according to the determined number with at least one of a random selection, a criterion-based selection and a self-information based selection.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DESCRIPTION

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art, Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation" and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the following present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like are set forth for providing an understanding of the disclosed technology. In other examples, detailed description of well-known methods, technologies, systems, and architectures are omitted so as not to obscure the description with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific integrated Circuitry (ASIC), programmable logic arrays, and/or using one or more Digital Signal Processor (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read. Only Memory (ROM), Erasable Programmable Read-Only Memory (EPROM), Electrically Erasable Programmable Read-Only Memory (EEPROM), flash memory, Compact Disc (CD) Read-Only Memory (CD ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or an NR system may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation (NG) Core (NGC) network, a Fifth Generation (5G) CN (5GC), or an Internet via a Radio Access Network (RAN) established by the BS.

It should be noted that, in the present disclosure, a UE may include, but is not limited to, a mobile station, a mobile terminal or device, or a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a BS controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (CPRS), UMTS (often referred to as 3G) according to basic Wideband-Code Division NMultiple Access (W-CDMA), High-Speed Packet Access (HSPA), LTE, LTE-A, enhanced LTE (eLTE), NR (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system via the plurality of cells. A cell may allocate Sidelink (SE) resources for supporting Proximity Service (ProSe), LTE SE services, and LTE/NR Vehicle-to-Everything (V2X) services, Each cell may have overlapped coverage areas with other cells.

Figure 1:
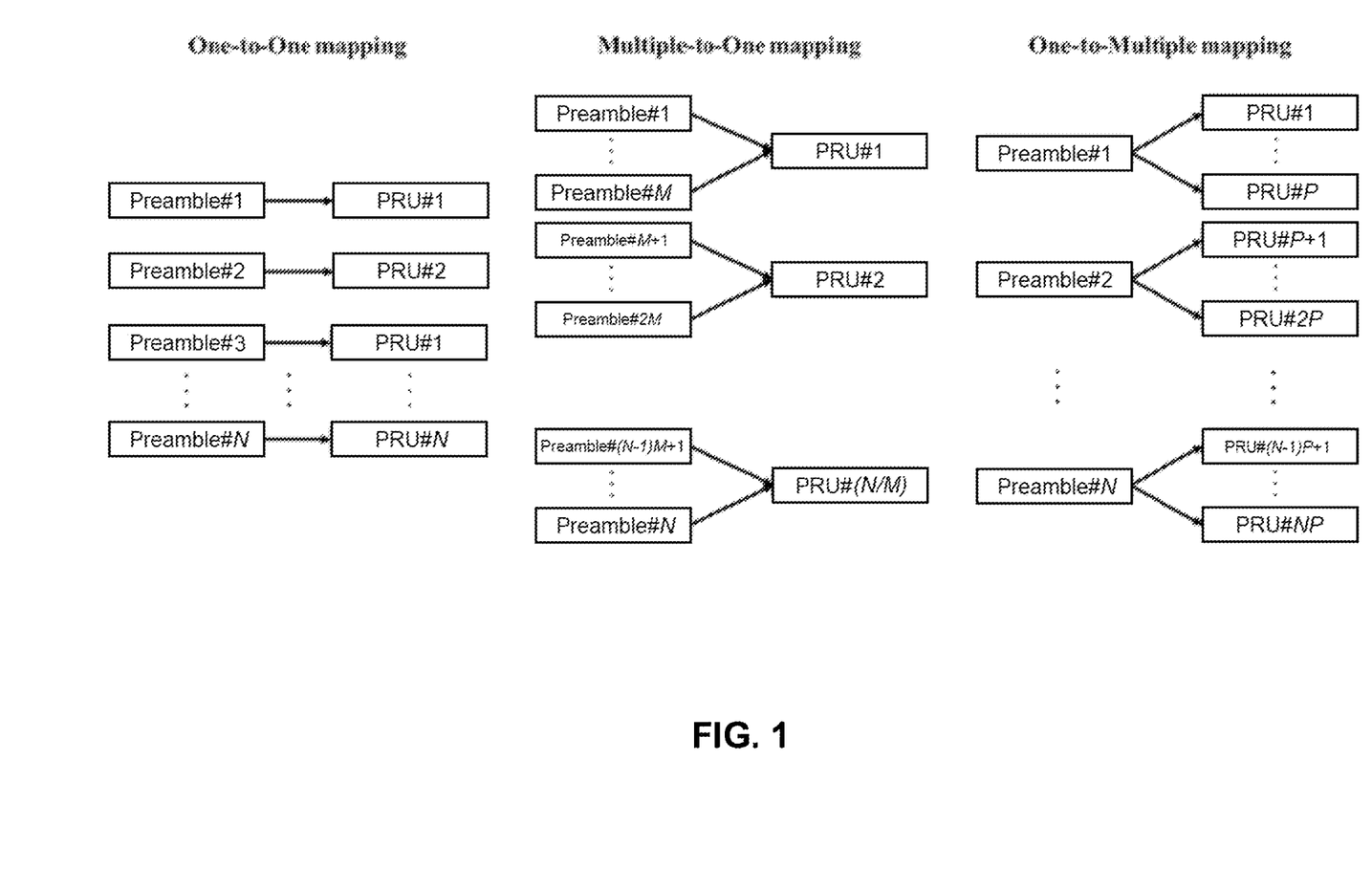
FIG. 1 is a schematic diagram illustrating different mapping types between preamble and PRU, according to an implementation of the present disclosure.

The 2-step RA procedure, as described above, supports three mapping types (e.g., one-to-one mapping, multiple-to-one mapping, and one-to-multiple mapping). FIG. 1 is a schematic diagram illustrating different mapping types between a preamble (e.g., Preamble #1 to Preamble #N) and a PRU (e.g., PRU #1 to PRU #1 #M, and PRU #1 to PRU #1 #NP), in accordance with example implementations of the present disclosure. For one-to-one mapping, 'N' preambles are mapped to 'N' PRUs, respectively. For multiple-to-one mapping, 'N' preambles are divided into equal-sized (N/M) groups, and each preamble group is mapped to each independent PRU. For one-to-multiple mapping, 'N*P' PRUs are divided into 'N' groups containing 'P' PRUs, and each PRU group corresponds to a dedicated preamble. In addition to these three mapping types, multiple-to-multiple mapping is also a possible mapping type. This mapping type can be viewed as a combination of multiple-to-one mapping and one-to-multiple mapping.

For one-to-multiple mapping or multiple-to-multiple mapping, one preamble may be mapped to several PRUs which can be viewed as a PRU pool. This mapping type may be very beneficial for the Msg-A transmission. For example, when different UEs select the same PRACH occasion for preamble transmission, the UEs may have multiple PRUs to select from for payload transmission to avoid PRU collisions. Once the selected PRU(s) are different from each other, the payload from each device may be decoded successfully with higher probability. Moreover, for the Ultra-Reliable Low-Latency Communication (URLLC) service, duplication/repetition data transmission via the 2-step RA procedure by using multiple PRUs of the Msg-A to transmit the same payload may be important. However, which PRUs should be selected to transmit payloads is not disclosed. In addition, how many PRUs in a PRU pool should be selected should be addressed. Specifically, if a UE selects one or more PRUs within a PRU pool to transmit payloads, the UE should determine which PRUs or a number of PRUs may be used for payload transmission.

Figure 2:
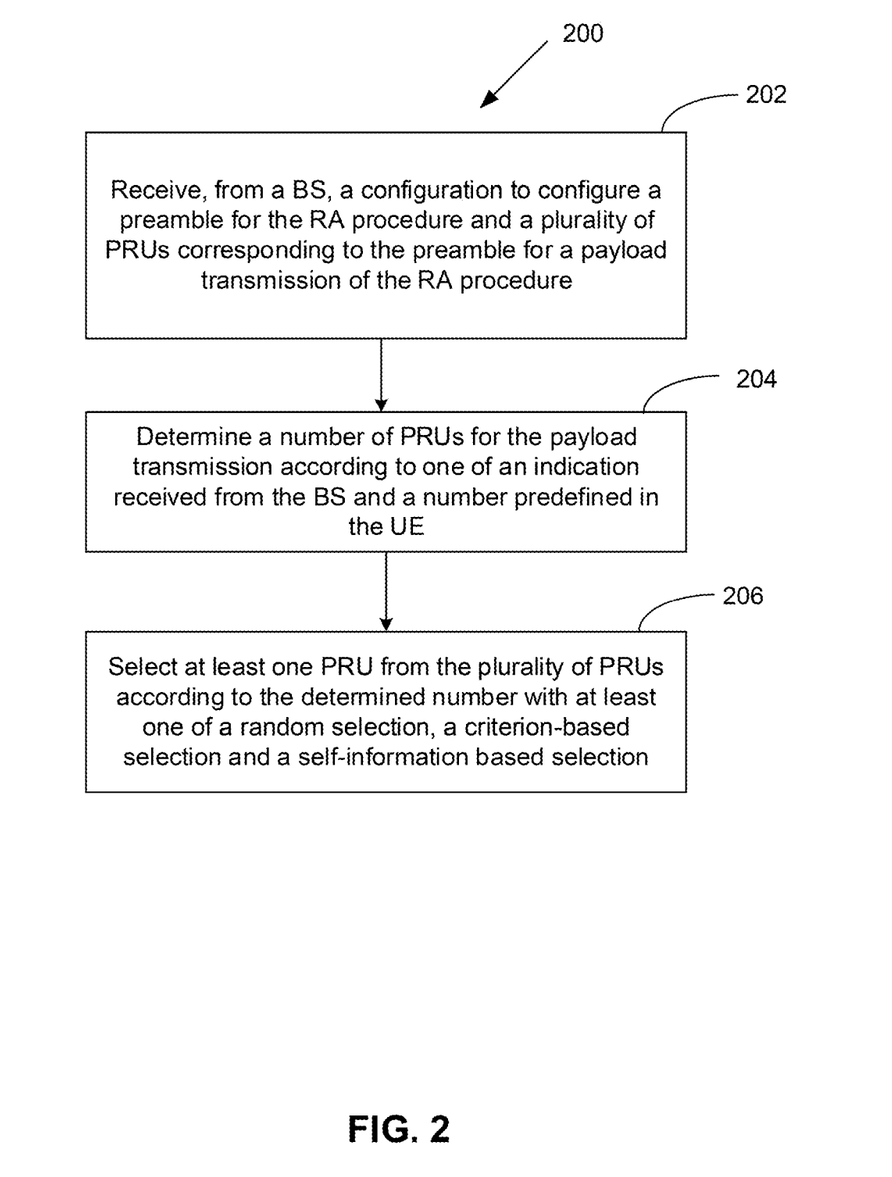
FIG. 2 is a flowchart illustrating a method for PRU selection, according to an implementation of the present disclosure.

FIG. 2 is a flowchart illustrating a method/process 200 for a UE to select a PRU in a RA procedure (e.g., 2-step RA procedure)transmission. In action 202, the UE receives, from a BS, a configuration to configure a preamble for the RA procedure and a plurality of PRUs corresponding to the preamble for a payload transmission of the RA procedure. In action 204, the UE determines a number of PRUs for the payload transmission according to one of an indication received from the BS and a number predefined in the UE. In action 206, the UE selects at least one PRU from the plurality of PRUs according to the determined number with at least one of a random selection, a criterion-based selection and a self-information based selection.

For one preamble-to-multiple PRUs or multiple preambles-to-multiple PRUs mapping types, one way to successfully decode payloads in the for an Msg-A transmission when different UEs select the same preamble (e.g., select the same PRACH occasion for preamble transmission of the Msg-A) may be that each UE selects a different PRU to transmit its payload of the Msg-A. In some implementations, when one preamble-to-multiple PRUs mapping or multiple preambles-to-multiple PRUs mapping is applied for 2-step RA procedure, a UE may be allowed to select one or more PRUs from a PRU pool which correspond to a preamble to transmit payloads. Therefore, a BS may decode the payloads from different UEs successfully even though these UEs select the same preamble (e.g., select the same PRACH occasion for preamble transmission of an Msg-A).

When a UE receives an Msg-A transmission configuration parameters (e.g., via broadcasting system information or dedicated signaling), the UE may obtain a preamble format and multiple PRUs (e.g., configured RPUs or an assigned PRU pool) that correspond to the preamble for payload transmission. When a 2-step RA procedure is initiated by the UE, the UE may select a PRACH occasion for Msg-A transmission and select at least one PRU from the configured PRUs to transmit the payload. It is noted that the PRU selection method (from the configured PRUs or an assigned PRU pool) may be random selection, criterion-based selection, or self-information-based selection.

In one implementation, a PRU pool associated with a preamble may be orthogonal with PRU pools associated with other preambles. A UE does not expect collision on PRU selection with other UEs selecting different preambles.

Random Selection

In some implementations, a UE may randomly select one or more PRUs from an assigned PRU pool corresponding to a preamble format indicated by a BS. For example, if the BS assigns a PRU pool with size '4' (e.g., 4 PRUs in a PRU pool), then the UE may randomly select two PRUs from the PUR pool to transmit the payloads when the UE receives the assigned PRU pool information (e.g., a PRU position in time/frequency domain, the size of a PRU pool).

In some implementations, the BS may indicate how many PRU(s) are allowed to be selected for payload transmission from a corresponding PRU pool if a PRACH occasion for Msg-A transmission is selected from a Msg-A transmission configuration parameters (e.g., 2-step RA configurations), which may be received via broadcasting system information or dedicated signaling.

In some implementations, when one-to-multiple mapping or multiple-to-multiple mapping for a 2-step RA procedure is applied, a UE that initiates the 2-step RA procedure is only allowed to select one PRU from a corresponding PRU pool if a PRACH occasion for Msg-A transmission is selected in the 2-step RA configurations, as described above.

In some implementations, if the BS does not indicate the number of PRU(s) to be selected for payload transmission from a corresponding PRU pool, the UE that initiates a 2-step RA procedure is only allowed to select one PRU from the corresponding PRU pool.

Criterion-Based Selection

In some implementations, a UE may select PRUs based on some criteria, such as Received Signal Strength Indicator (RSSI), Reference Signal Receive Power (RSRP), interference level, or an amount of initial transmit power, but not limited to these criteria.

In some implementations, the BS may indicate a threshold (e.g., via broadcasting system information or dedicated signaling) to a UE to select the (qualified) PRUs for payload transmission if a 2-step RA procedure is initiated. In some examples, if RSSI is used as the criterion, the UE may detect the RSSI of all PRUs in the assigned PRU group, and then the UE may select the PRU(s) which have RSSI below a threshold to transmit the payloads. If there is no PRU with RSSI below the threshold, the UE may select the PRU with the lowest RSSI for payload transmission.

In some implementations, an amount of resources for individual PRUs in a PRU pool may be different. Different combinations of PRUs may result in different initial transmit power for Msg-A transmission. The UE may select PRUs to reach a PRU combination which fulfills some specific requirements or thresholds. For example, for power saving purposes, the UE may select a fixed amount of PRUs but with minimum initial transmit power for Msg-A transmission.

Self-Information-Based Selection

In some implementations, a UE may select one or more PRUs from an assigned PRU pool corresponding to the preamble format (or PRACH occasion) based on self-information (e.g., UE identity (ID)). The UE ID may be derived by the UE from a higher layer ID, for example, SAE-Temporary Mobile Subscriber Identity (S-TMSI).

In some implementations, if a PRU pool has 'n1' PRU(s), a UE may select the (UE ID mod n1)-th PRU for payload transmission. For example, if there are '4' PRUs in the PRU pool and the UE ID of the device translates to '9', then the device may select the first PRU for payload transmission.

In some implementations, the order of the PRU(s) in a PRU pool is based on a time domain or frequency domain. For example, the PRU that comes first may be determined as the first PRU of the PRU pool and the next coming PRU may be determined as the second PRU. For example, the PRU with the shortest offset (from the selected PRACH occasion) may be determined as the first PRU.

In some implementations, a BS may provide some parameters to a UE to perform the self-information-based selection. For example, the base station may provide a parameter 'n2'. Accordingly, the UE may select the (UE ID mod 'n2')-th PRU for payload transmission, regardless of the number of PRU(s) in the corresponding PRU pool. In another example, ('n1' mod 'n2')-th PRU may be applied, which is not limited herein. In other words, any formula may be applied for the self-information-based selection.

Figure 3:
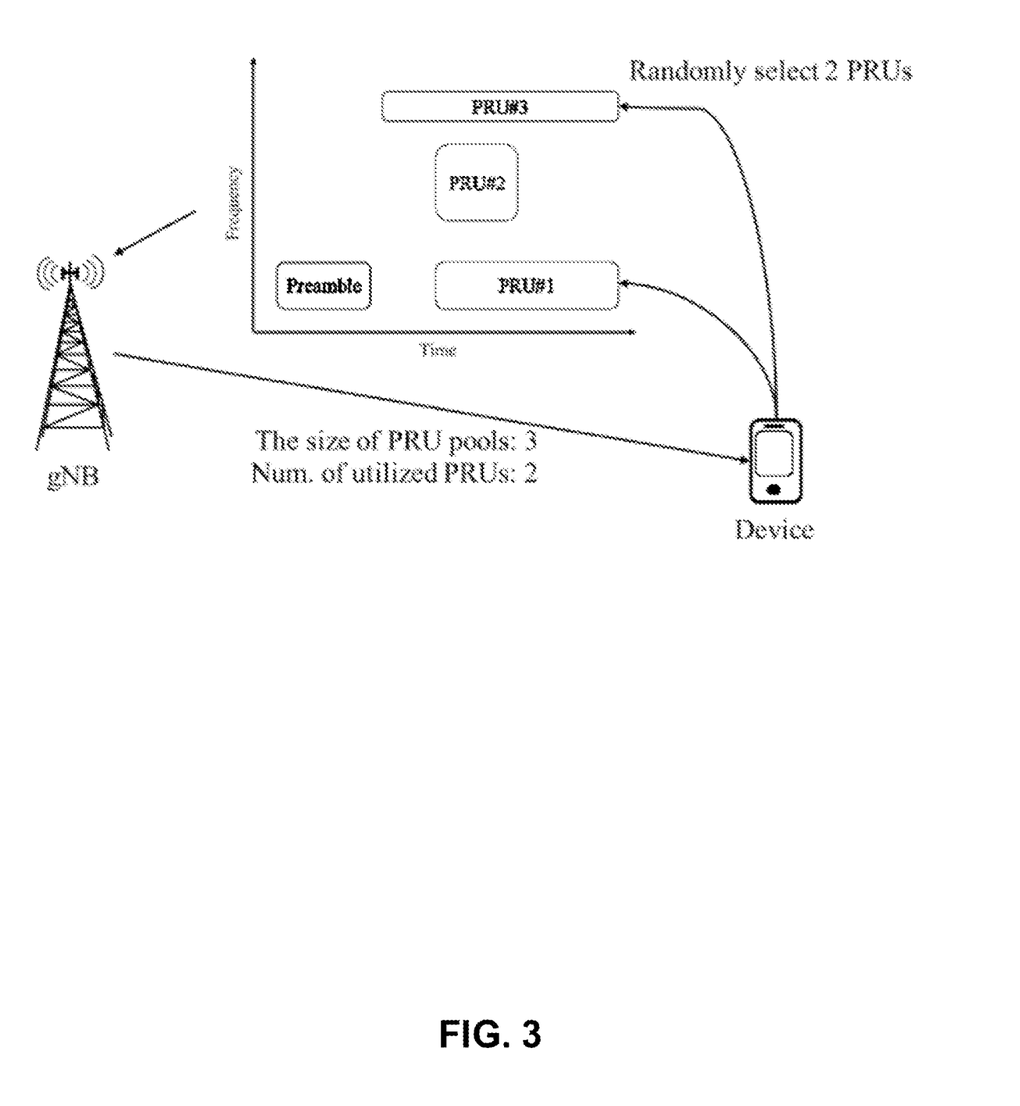
FIG. 3 is a schematic diagram illustrating a random-based PRIJ selection, according to an implementation of the present disclosure.

FIG. 3 is a schematic diagram illustrating a random-based PRU selection, in accordance with example implementations of the present disclosure. If a UE successfully decodes the system information and obtains an Msg-A transmission configuration parameters from the gNB, the UE may obtain a PRU pool corresponding to the assigned preamble format (or the PRACH configuration/occasions). Also, the UE may obtain the information on how many PRUs the UE may be allowed to use to transmit the payloads in the PRU pool.

For simplicity, in the following examples, a preamble is mapped to '3' PRUs (the size of the PRU pool is '3') and the number of PRUs that the UE may use for payload transmission is '2'. As illustrated in FIG. 3, the UE randomly selects two PRUs from the PRU #1 to the PRU #3. Eventually, the PRU #1 and the PRU #3 are selected to transmit the payloads as a result of the random-based selection.

Figure 4:
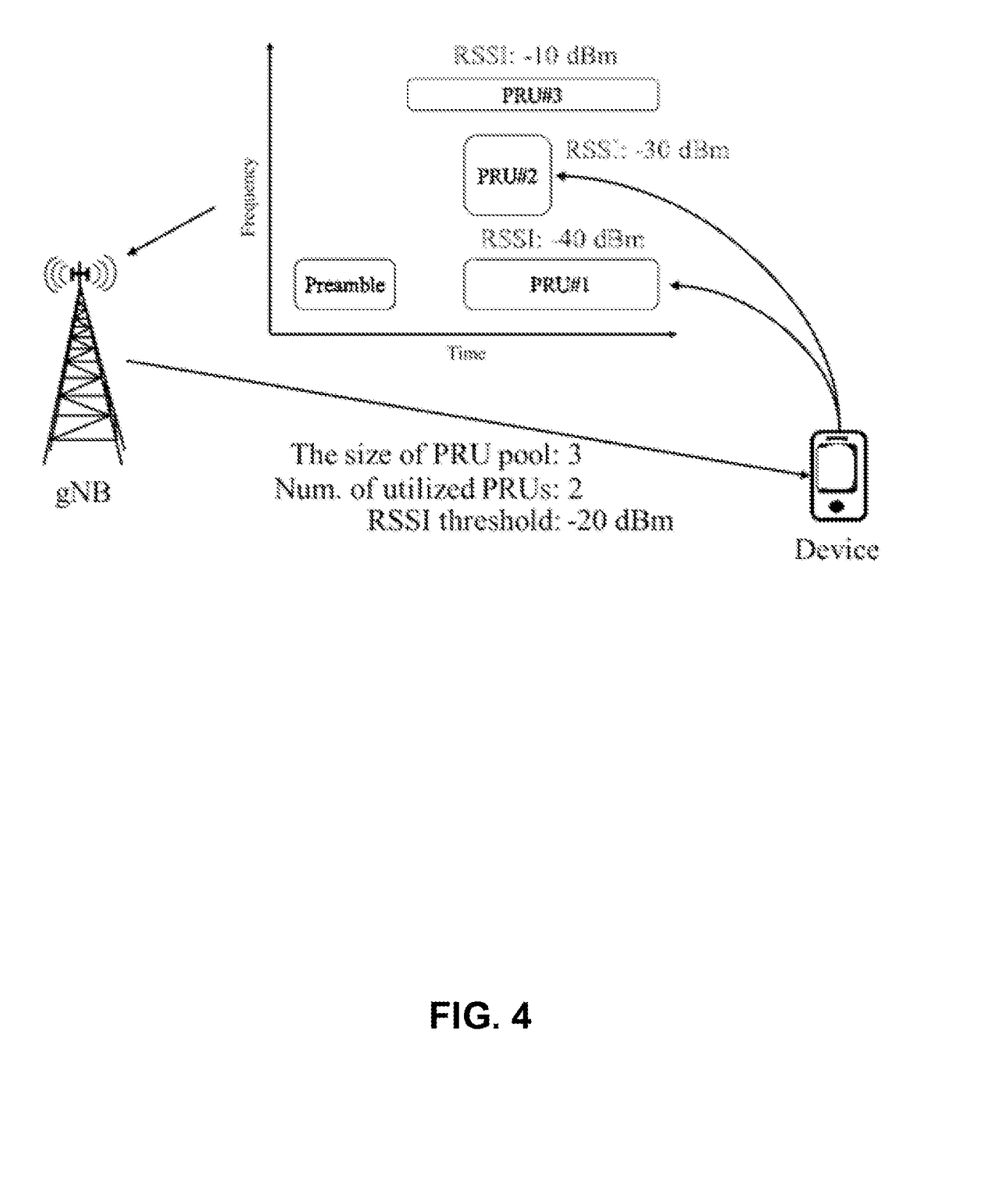
FIG. 4 is a schematic diagram illustrating a criterion-based PRU selection, according to an implementation of the present disclosure.

FIG. 4 is a schematic diagram illustrating a criterion-based PRU selection, in accordance with example implementations of the present disclosure. In one example, an RSSI is applied for the criterion-based PRU selection. As illustrated in FIG. 4, the RSSI values of the PRU #1, PRU #2, and PRU3 are −40 dBm, −30 dBm, and −10 dBm, respectively. Therefore, the UE selects PRU #1 and PRU #2 which have better RSSI values to transmit the payloads.

Figure 5:
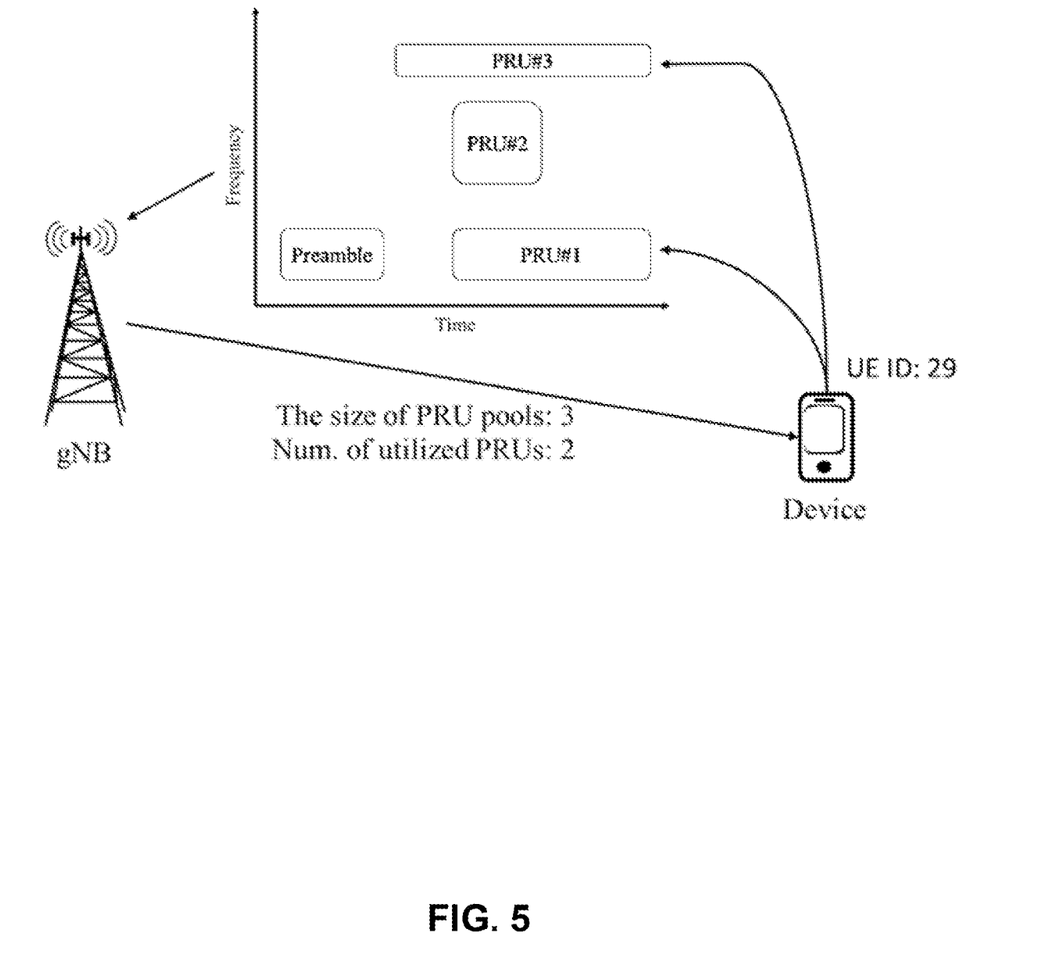
FIG. 5 is a schematic diagram illustrating a self-information-based PUT selection, according to an implementation of the present disclosure.

FIG. 5 is a schematic diagram illustrating a self-information-based PRU selection, in accordance with example implementations of the present disclosure. In one example, a UE ID is applied for the self-information-based selection. As illustrated in FIG. 5, the UE ID is '29', the UE may select PRUs to transmit payloads according to some formula based on this UE ID. An example of the formula is given as below:

The first selected PRU: ((UE ID) mod (the size of PRU pool))+1.

With this formula, the UE obtains the equation as (29 mod 3)+1=3.

The second selected PRU: ((The first selected PRU number)+1) mod (the size of PRU pool).

With this formula, the UE obtains the equation as (3+1) mod 3=1.

Based on the result of the formula, the UE selects the PRU #1 and PRU #3 for the payload transmission.

Furthermore, for one preamble-to-multiple PRUs mapping type, a UE may have multiple PRUs to select from for the payload transmission. However, the UE may not use all assigned PRUs to transmit the payloads all the time. For example, under a selection diversity consideration and/or a power consumption issue, the UE may use one PRU or simply a few PRUs. Conversely, under a reliability consideration, repeating the same payloads in all assigned multiple PRUs may be beneficial. Therefore, it's important to determine the number of utilized PRUs for the UE to transmit the payloads in the available PRUs.

Specifically, according to different situations, the number of utilized PRUs for payload transmission may be different. In case of urgent and high reliability service, it's beneficial for the UE to use large number of PRUs. The number of PRUs for payload transmission may be determined by the gNB (e.g., cell-specific) or the UE (e.g., UE-specific). Based on cell-specific and UE-specific principles, several cases are disclosed below.

Cell Specific

In some implementations, the number of utilized PRUs may be equal to the size of the assigned PRU pool.

In some implementations, based on the parameters or configurations related to a 2-step RA procedure, a UE may use all assigned PRUs to transmit the payloads.

In some implementations, a 2-step RA configuration related to one-to-multiple or multiple-to-multiple mappings may be used for the URLLC service based on an indication from the gNB. For example, if a UE in the RRC inactive state initiates a 2-step RA procedure for (small) data transmission, the UE may select the preamble (or PRACH configuration/occasions) associated with multiple PRUs for duplicating/repeating the payload transmission.

In some implementations, a 2-step RA configuration related to one-to-multiple or multiple-to-multiple mappings may be used to duplicate the payload transmission for high reliability. For example, the gNB may indicate to the UEs to directly repeat their payloads in each PRU. Different repetitions on each PRU may be different redundancy versions (RVs) of the same transport block (TB). The RV versions to be used may follow a predefined rule. For example, RV ordering [0,2,3,1] may be pre-specified. When '1' PRU is used, the RV version 0 is applied. When '2' PRUs are used, RV versions 1 and 2 are applied, etc. In another example, a single RV is applied over the PRUs used for payload transmission. In this case, RV version 0 is preferred.

In some implementations, a 2-step RA configuration related to one-to-multiple or multiple-to-multiple mappings may be used to duplicate the payload transmission for high reliability. For example, the gNB informs the UEs about the relationship between RVs and each PRU, or if this relationship is predefined, then each UE may utilize corresponding PRUs to transmit different RVs of payloads on corresponding PRUs to the gNB for soft combining.

In some implementations, 2-step RA configuration related to one-to-multiple or multiple-to-multiple mappings may be used for duplication/repetition transmission for high reliability. For example, a UE may transmit the same payload on each assigned PRU.

In some implementations, a 2-step RA configuration related to one-to-multiple or multiple-to-multiple mappings may be used for a high reliability transmission. For example, the Demodulation Reference Signal (DMRS) sequence on each PRU may be determined by the UE's self-information, such as UE ID, to avoid DMRS collisions when different UEs use the same PRUs to transmit the payloads.

In some implementations, the gNB may provide different 2-step RA configurations with different mapping types (e.g., one for one-to-one mapping and the other for one-to-multiple mapping).

In some implementations, based on the RA triggering events, service types, or device categories (but not limited to such categories), a UE may apply the 2-step RA configuration with a specific mapping type to initiate a 2-step RA procedure. For example, for a device targeting a URLLC service, the UE may apply the 2-step RA configuration with one-to-multiple or multiple-to-multiple mapping types to initiate a 2-step RA procedure. For example, for a UE targeting an Enhanced Mobile Broadband (eMLBB), the UE may apply the 2-step RA configuration with a one-to-one mapping type to initiate a 2-step RA procedure.

In some implementations, the number of utilized PRUs may be smaller than the size of the assigned PRU pool.

In some implementation, the gNB may indicate the number of utilized PRUs as 'n3' allowed for Msg-A transmission (e.g., receiving via broadcasting system information or dedicated signaling).

In some implementations, such a parameter 'n3' may be configured with a few values, with individual values applicable for different services. For example, a UE supporting a URLLC-based service may be provided with two 'n3' values, one for the URLLC service and the other one for the other services.

It is noted that in this case, the number of utilized PRUs may also be equal to the size of the assigned PRU pool.

When the gNB configures a number of PRUs to be used, even though a transmitting PDU size may not fulfill the number of PRUs (e.g., too small or too big), the UE may use the configured number. It may mean that the UE adds pending bits if the PRU number with corresponding payload size is larger than the UE's intended size and the UE may do segmentation for the transmitted PDU if the PRU number with corresponding payload size is smaller than the UE's intended size.

UE Specific

It is noted that some default configurations may be predefined. For example, for the URLLC service, all PRUs of an assigned PRU pool may be used for payload transmission. For a normal case, only one PRU of an assigned pool may be used for payload transmission. For a large payload transmission case, 'K' PRUs of an assigned PRU pool may be used for payload transmission ('K' may be smaller than the size of the assigned PRU pool). If a transmitting PDU size may not fulfill the predefined number of PRUs corresponding to different services (e.g., too small or too big), the UE may use a predefined number. It may mean that the UE adds pending bits if the PRU number with corresponding payload size is larger than the UE's intended size and the UE may do segmentation for the transmitted PDU if the PRU number with corresponding payload size is smaller than UE's intended size.

In some implementations, a UE may determine the number of PRU(s) used for payload transmission.

In some implementations, a UE may determine to use only one PRU for payload transmission based on the RA triggering events, service types, or device categories, but not limited to these categories.

In some implementations, a UE may determine to use more than one PRU for payload transmission based on the RA triggering events, service types, or device categories, but not limited to these categories.

In some implementations, for different duplicate payload transmission schemes, such as directly duplication/repetition, redundancy version, etc., a UE may inform the gNB which scheme it performs through Medium Access Control (MAC) control element (CE) signaling, including the information related to the location of PRUs it used for payload transmission, or transmission power, but not limited to these categories.

In some implementations, the number of PRUs used for Msg-A transmission may be determined based on an interference level. The relation between the interference level and selected PRU(s) may be pre-specified/configured by BS. In one example, the higher the interference level, the higher the number of PRUs to be selected.

In one example, the interference level may be related to the DL measurement(s) used for selecting an associated preamble to the concerned PRU pool. In some examples, the interference level may be related to the measurement(s) performed on the PRU pool. In some examples, the interference level may be reflected in terms of RSSI, L1-RSRP, L1 Signal to Interference plus Noise Ratio (SINR), etc.

For one preamble to multiple PRUs mapping type, the gNB may broadcast the size of a PRU pool which is mapped to an associated preamble. Since the number of PRUs to be used to transmit the payloads may be known by the UE, various cases in cell-specific and UE-specific manners are disclosed below.

In a first case, the number of utilized PRUs is equal to the size of the assigned PRU pool. The UE may use all the PRUs in the assigned PRU pool. In this case, the gNB broadcasts the parameters of the size of the assigned PRU pool to the UEs. The UE receives the information of the size of the assigned PRU pool, and then transmits the payloads on all of the PRUs in the assigned PRU pool.

In a second case, the number of utilized PRUs is smaller than the size of the assigned PRU pool. The gNB broadcasts the parameters of the size of the assigned PRU pool and the number of PRUs that the UEs may use for payload transmission in the assigned PRU pool.

In one example, the size of the assigned PRU pool is '4', and the number of PRUs that UEs can use for payload transmission is '2'. The maximum size for payload transmission on each PRU may be predefined as '56'. In this example, the size of payload that is required to be transmitted is 50 bits.

The UE may add '62' padding bits for the transmission payload that includes 112 bits, and then the UE transmit these payload bits on 2 PRUs that is selected from the assigned PRU pool.

In a third case, the number of PRUs is determined based on different criteria. The UE may determine the number of PRUs to be used for payload transmission in the assigned PRU pool. The determination may be based on some criteria as follows.

The gNB broadcasts the size of the assigned PRU pool. The UE may determine the number of PRUs that may be used for payload transmission based on the BS signaling.

In some examples, the determination made by the UE may be based on RSSI. Assuming the size of the assigned PRU pool is '3', the threshold value #1 and threshold value #2 may be predefined to the UE, where threshold value #1>threshold value #2.

If a measured_RSSI>threshold value #1, the number of PRUs that are used for payload transmission is 1.

If threshold value #1≥measured_RSSI>threshold value #2, the number of PRUs that are used for payload transmission is 2.

If threshold value #2≥measured_RSSI, the number of PRUs that are usedfor payload transmission is 3.

In some examples, the determination made by the UE is based on the payload size. Assuming the size of the assigned PRU pool is '3', the maximum payload size of each PRU is 56 bytes, and the payload size for the device to transmit the payloads is 90 bytes. The number of PRUs devices that are used for payload transmission is [90/56].

In some examples, the determination made by the UE is based on a service type. Assuming the size of the assigned PRU pool is '3', and the required service type is low latency and high probability, the number of PRUs that are used for payload transmission is '3', and these 3 PRUs may be used to transmit the same payload.

Finally, after the UE determines the number of PRUs for payload transmission, the UE may select that number of PRUs in the assigned PRU pool to transmit the payloads.

Figure 6:
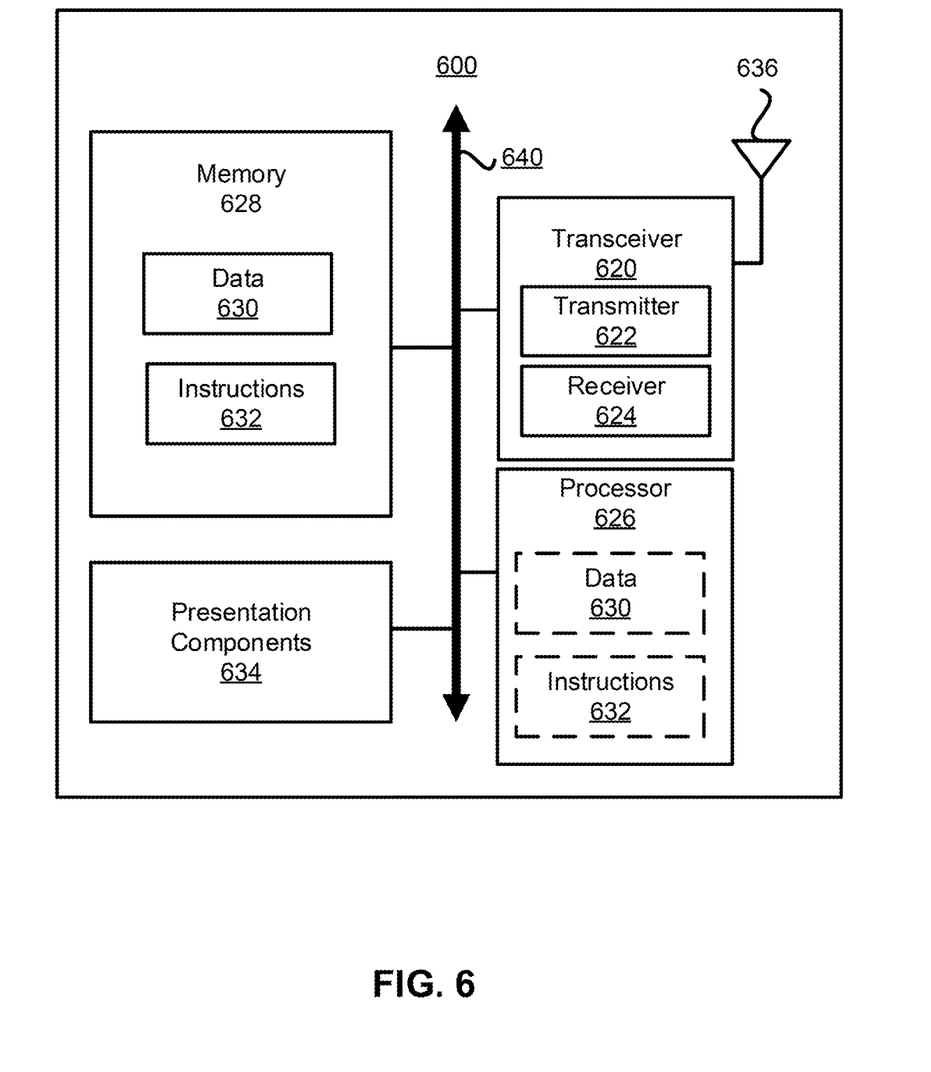
FIG. 6 is a block diagram illustrating a node for wireless communication, according to an implementation of the present disclosure.

FIG. 6 illustrates a node 600 for wireless communication according to the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, and a system communications management module, input/output (I/O) ports, I/O components, and a power supply (not illustrated). Each of these components may be in communication with each other, directly or indirectly, over one or more buses 640. The node 600 may be a UE that performs various disclosed functions as illustrated in FIG. 2.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any media that can be accessed by the node 500 and include both volatile and non-volatile media, removable and non-removable media. Computer-readable media may include computer storage media and communication media. Computer storage media may include both volatile and non-volatile, as well as removable and non-removable media implemented according to any method or technology for storage of information such as computer-readable instructions, data structures, program modules or other data.

Computer storage media may include RAM, ROM, EPROM, EEPROM, flash memory (or other memory technology), CD-ROM, DVD (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanism and includes any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device (e.g., a central processing unit (CPU), a microcontroller, an ASIC, etc. The processor 626 may include memory. The processor 626 may process the data 630 and the instructions 632 received from the memory 628, and information through the transceiver 620, the baseband communications module, and/or the network communications module. The processor 626 may also process information to be sent to the transceiver 620 for transmission via the antenna 636, to the network communications module for transmission to a CN.

One or more presentation components 634 may present data to a person or other devices. Presentation components 634 may include a display device, speaker, printing component, vibrating component, etc.

From the present disclosure, it s evident that various techniques can be utilized for implementing the concepts of the present disclosure without departing from the scope of those concepts. Moreover, while the concepts have been disclosed with specific reference to specific implementations, a person of ordinary skill in the art would recognize that changes can be made in form and detail without departing from the scope of those concepts: As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for uplink transmission performed by a user equipment (UE), the method comprising:
   receiving, from a base station (BS), a threshold;
   determining at least one uplink grant based on the threshold;
   performing a payload transmission on the at least one uplink grant, while the UE is in a Radio Resource Control (RRC) inactive state; and
   in the payload transmission, not transmitting only padding bits for the payload transmission on the uplink grant,
   wherein the payload transmission on the at least one uplink grant uses only a redundancy version (RV) 0.

2. The method of claim 1, wherein the threshold is associated with a Reference Symbol Received Power (RSRP) or a Received Signal Strength Indication (RSSI).

3. The method of claim 1, wherein receiving the threshold from the BS comprises receiving the threshold via broadcasting system information or dedicated signaling.

4. A user equipment (UE) for uplink transmission, the UE comprising:
   at least one processor; and
   at least one non-transitory computer-readable medium coupled to the at least one processor and storing one or more computer-executable instructions that, when executed by the at least one processor, cause the UE to:
   receive, from a base station (BS), a threshold;
   determine at least one uplink grant based on the threshold;
   perform a payload transmission on the at least one uplink grant while the UE is in a Radio Resource Control (RRC) inactive state; and
   in the payload transmission, not transmit only padding bits for the payload transmission on the uplink grant,
   wherein the payload transmission on the at least one uplink grant uses only a redundancy version (RV) 0.

5. The UE of claim 4, wherein the threshold is associated with a Reference Symbol Received Power (RSRP) or a Received Signal Strength Indication (RSSI).

6. The UE of claim 4, wherein receiving the threshold from the BS comprises receiving the threshold via broadcasting system information or dedicated signaling.

* * * * *